United States Patent [19]
Lundquist et al.

[11] 3,745,467
[45] July 10, 1973

[54] MULTI-BAND RADIO RECEIVER

[75] Inventors: Robert L. Lundquist, Frankfort; Charles J. Mathey, Arlington Heights, both of Ill.

[73] Assignee: Motorola, Inc., Franklin Park, Ill.

[22] Filed: Sept. 10, 1971

[21] Appl. No.: 179,389

[52] U.S. Cl. .................... 325/304, 325/315
[51] Int. Cl. .................... H04b 1/10
[58] Field of Search .................... 325/302, 304, 305, 325/306, 307, 315

[56] References Cited

UNITED STATES PATENTS

| | | | |
|---|---|---|---|
| 2,685,643 | 8/1954 | Fisk et al. | 325/304 |
| 2,504,341 | 4/1950 | Matthews | 325/304 |

*Primary Examiner*—Benedict V. Safourek
*Attorney*—Vincent Rauner et al.

[57] ABSTRACT

A radio receiver which selects automatically, for translation into an audio output, radio frequency signals received on one waveband in preferance to radio frequency signals received simultaneously therewith on another waveband includes a pair of receivers, each of which is capable of receiving radio frequency signals on a different waveband simultaneously with the other. A wave detector providing a positive output voltage is coupled to one of the receivers and a second wave detector providing a negative output is coupled to the other receiver. The output voltages provided by the detectors are proportional to the signal strengths of the radio frequency signals received by corresponding receivers. A potentiometer is coupled to the detectors and sums the voltages proportionally in accordance with the setting thereof. A bistable multivibrator senses the polarity of the resultant voltage and in accordance therewith operates one of two audio switches to pass audio signals from a corresponding receiver to an audio translator.

9 Claims, 3 Drawing Figures

MULTI-BAND RADIO RECEIVER

BACKGROUND OF THE INVENTION

This invention relates generally to multi-band radio receivers and more particularly to such radio receivers which receive simultaneously, radio frequency signals on more than one waveband and which compare characteristics of the signals to determine the priority of translation thereof into an audio output.

It is advantageous in a radio receiver in which multi-band radio frequency signals are received simultaneously, such as, for example, one of the AM/FM type, to permit a listener to program the receiver to translate into an audio output signals of a preferred one of the wavebands automatically in accordance with the relative signal strength thereof, while tuning the receiver over its range of frequencies.

It is also desirable that in the case of a conflict, i.e., wherein the signal strength of simultaneously received signals is approximately equal, the listener may program the receiver to automatically select radio frequency signals from a preferred waveband for translation into an audio output even though the signals received on the preferred waveband are weaker than those on the other waveband.

SUMMARY OF THE INVENTION

Accordingly, it is an object of the present invention to provide a new and improved radio receiver capable of receiving simultaneously, radio frequency signals on different wavebands, which is programmable to select the received signals of one of the wavebands for translation into an audio output in accordance with the strength of the radio frequency signals of that waveband relative to the strength of radio signals of another waveband.

It is yet another object of the present invention to provide a multi-band radio receiver of the above-described type wherein in the case of a conflict between the relative strengths of simultaneously received signals, signals on a preselected waveband are automatically translated into an audio output.

Briefly, a preferred embodiment of the radio receiver according to the invention includes both AM and FM receiver portions which receive, simultaneously, radio signals on corresponding wavebands. Connected to the receiver portions is comparator circuitry which compares the relative strengths of the signals. Depending thereon, the signals on one or the other of the wavebands are translated into an audio output. The comparator circuitry is adjustable by the listener to change the relative signal strength requirement so that an AM or FM signal which is predeterminedly weaker than a signal received simultaneously on the other waveband, may be selected for translation to an audio output over the stronger signal. Furthermore, adjustment of the comparator circuitry as described may be varied over a relatively wide range.

In a specific embodiment of the invention, the comparator circuitry includes negative and positive wave detectors, the former of which is connected to receive an IF signal from one of the receiver portions and the latter of which is connected to receive an IF signal from the other receiver portion. Outputs from the detectors which are proportional to the strength of the IF signal received thereby, are summed proportionally to produce either a D.C. voltage. The magnitude of the voltage determines which of the audio signals derived from the simultaneously received radio frequency signals is to be translated into an audio output. Adjustment of a potentiometer connected to the outputs of the detectors changes the ratio of the positive and negative voltage outputs of the detectors used in the summation of the voltage outputs to in turn alter the signal strength requirement of the signals for translation into an audio output as desired.

DETAILED DESCRIPTION

Figure 1:
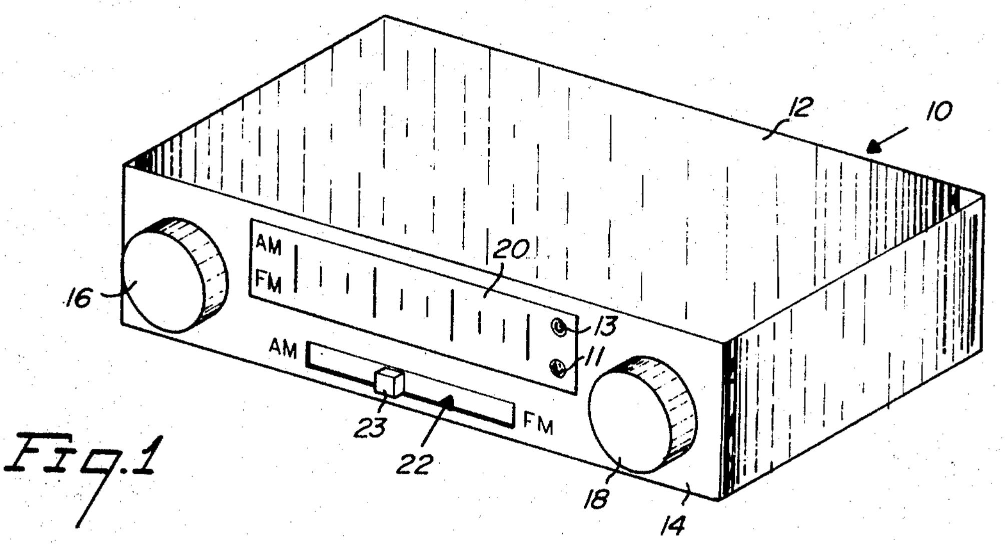
FIG. 1 is a perspective view of a multi-band radio receiver according to the invention.

Referring now to the drawings in greater detail, wherein like numerals have been employed throughout the various views to designate similar parts, there is illustrated in FIG. 1 a multi-band radio receiver 10 according to the invention.

The radio receiver 10 includes the usual outer housing 12 having a faceplate from which there extends a pair of dials, one, 16, of which operates an on-off/volume control and the other 18, of which provides manual tuning of the receiver. As can be seen from the radio receiver dial indicator 20, the radio receiver is capable of receiving radio frequency signals both on AM and FM wavebands. A selector switch 22 having a movable wiper arm 23 is provided to adjust the signal strength requirement of signals received on a preferred waveband as opposed to the signals received on the other waveband which are translated into audio output signals. Waveband indicator lamps 11, 13 are also provided on the faceplate of receiver 10 to indicate visually to a radio listener the waveband to which he is listening. A more detailed description of the latter will be provided hereinafter.

Figure 2:
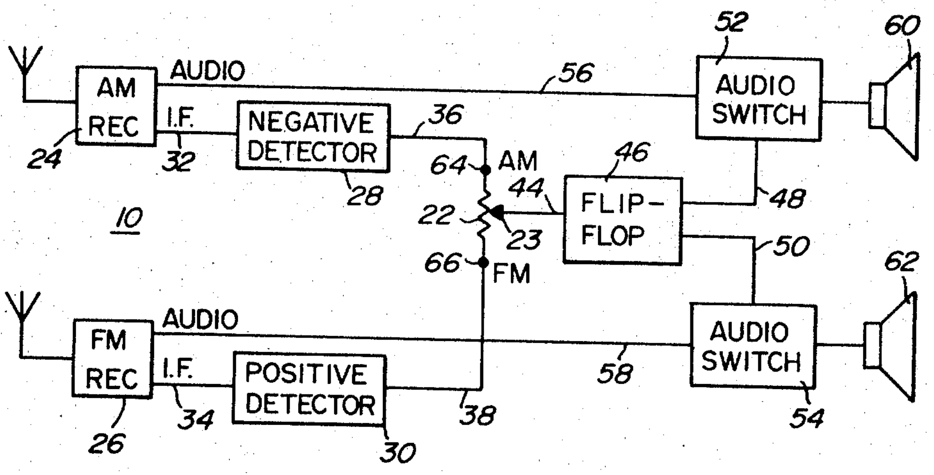
FIG. 2 is a diagrammatical representation of circuitry employed in the multi-band radio receiver of FIG. 1.

Referring to FIG. 2, the electronic components of the multi-band radio receiver 10 according to the invention are shown in block diagram form to more easily and clearly describe the operation of the radio receiver 10.

Radio receiver 10 includes first and second radio receiver portions 24, 26 which are capable of receiving radio frequency signals simultaneously on different radio wavebands, herein illustrated as an AM receiver portion 24 and an FM receiver portion 26.

A pair of wave detectors 28, 30 is connected to a source of IF signals in the radio receiver portions. The amplitudes of the IF signals are proportional to the amplitudes of the radio frequency signals received by the receiver portions. Herein as illustrated, a negative wave detector 28 is connected via lead 32 to receive IF signals from the AM receiver portion, and a positive wave detector 30 is connected via lead 34 to receive IF signals from the FM receiver portion 26. The polarity of the detectors may be reversed, however, without affecting the operation of the radio receiver according to the invention.

Output signals proportional in magnitude to the strength of the IF signals received, are provided by the detectors at output leads 36, 38, respectively. The resultant output signals, each of which is of a polarity corresponding to the detector from which it emanated, are applied to a voltage dividing potentiometer 22. The voltage outputs are effectively summed proportionally in accordance with the setting of wiper 23 of the potentiometer and fed via lead 44 to a bistable flip-flop or multivibrator 46.

The flip-flop 46, upon receiving a relatively negative signal, is operated to a first stable state and upon receiving a relatively positive signal to a second stable state. Outputs 48, 50 of the flip-flop 46 are connected to electronic audio switches 52, 54, respectively. The latter switches are interposed in the audio output leads 56, 58, of respective AM and FM receiver portions 24, 26. The audio switches are likewise connected to audio reproduction devices, such as, for example, speakers 60, 62, respectively, for translating the audio signals derived from the radio frequency signals received in the receiver portions into an audible audio output.

The state of the flip-flop 46, which as has been explained, is determined by the relative polarity of the input thereto, determines which of the audio switches 52, 54 is operated to pass the audio signals from a respective receiver portion to a corresponding speaker.

In operation, the wiper 23 of the potentiometer 22 may be moved to an infinite number of positions to vary the signal strength requirement of the radio frequency signals received by one of the receiver portions on a particular waveband preferred for translation into an audio output over radio frequency signals received on the other waveband. For example, in the case wherein the wiper 23 is positioned toward terminal 64 of the potentiometer, a great portion of the electrical resistance of the potentiometer is in series with the positive signal from detector 30, connected to the FM receiver portion. Thus, in effect, a substantially weaker AM radio frequency signal received simultaneously with the FM signal, will be translated into an audio output. Likewise, by moving the wiper 23 toward terminal 66, a weak FM signal will be translated over a stronger AM signal. The required strength of a signal on a preferred waveband which is translated into an audio output can be altered by movement of wiper 23 as described. Thus, placement of the wiper affects the signal strength requirement of a preferred waveband, so that if a listener desires to hear FM signals in preference to AM radio signals at the same dial setting, the listener can move the wiper 23 of the potentiometer 22 toward the FM terminal 66. The closer the wiper to the FM terminal, the weaker the FM signal need be for translation into an audio output over an AM signal received simultaneously therewith, and vice versa with respect to the AM waveband if the latter is preferred.

Figure 3:
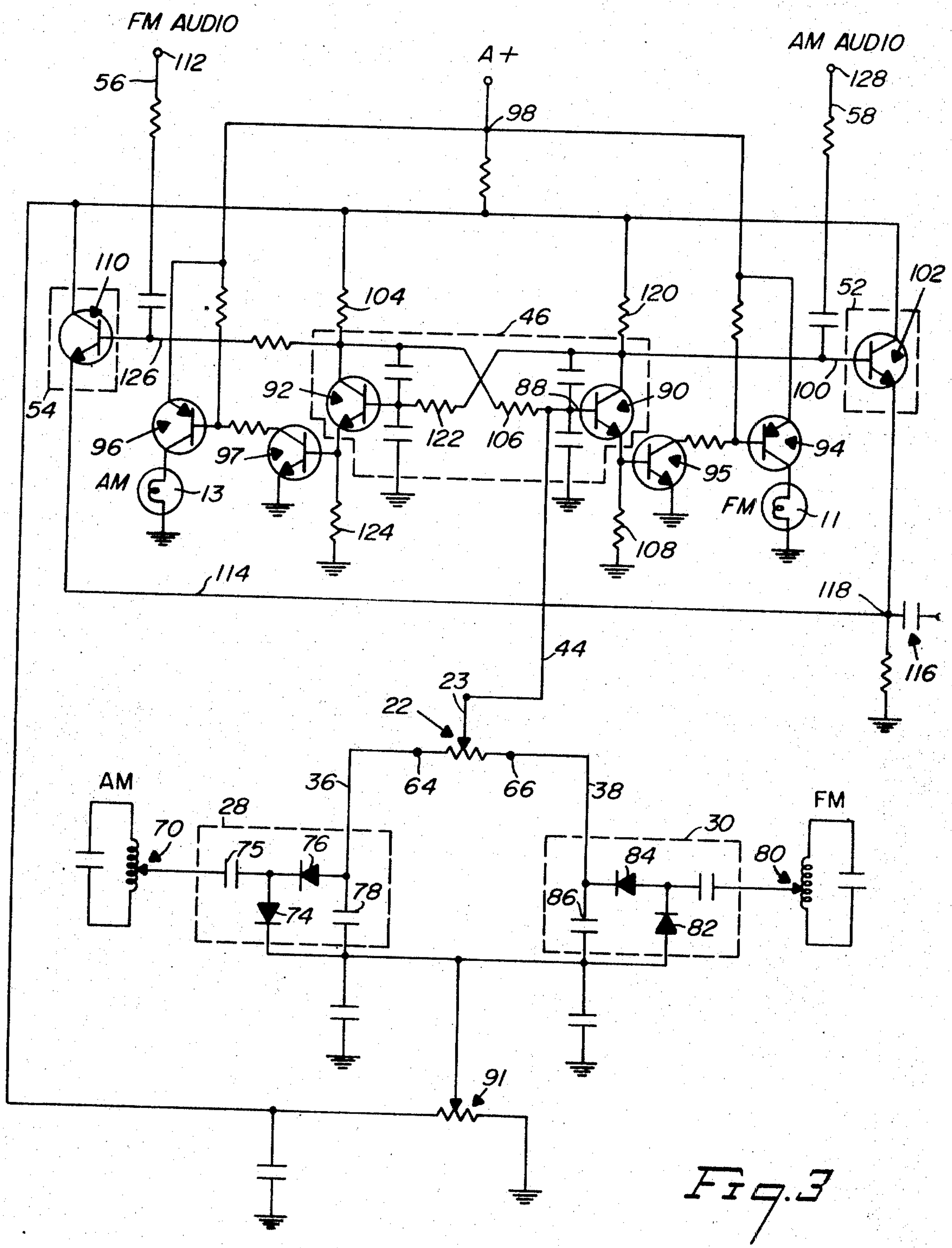
FIG. 3 is a schematic diagram of a preferred embodiment of the circuitry used in the radio receiver of FIG. 1.

Referring now to FIG. 3, there is provided a schematic diagram of a preferred embodiment of the circuitry for radio receiver 10 according to the invention. The various components therein corresponding to the block diagrams of FIG. 2 are numbered accordingly.

In the circuitry shown in FIG. 3, the receiver portions 24, 26 are not illustrated per se, however, the IF signal producing circuitry 70, 80 of the AM and FM receiver portions, respectively, as well as the AM and FM audio signal sources 128, 112, respectively, are shown.

Signals obtained from the IF signal circuitry 70 of the AM receiver portion are detected by the negative detector 28 comprised of diodes 74, 76 which are connected with capacitors 75,78 for use as a full wave detector circuit. The detector 28 as described heretofore, provides across capacitor 78, a negative DC voltage proportional to the amplitude of the AM signal. Similarly, the amplitude of the FM signal obtained from the IF signal circuitry 80 of the FM receiver portion is detected by diodes 82, 84 serving with capacitors 80, 86 as a full wave detector 30 to provide a positive DC voltage across capacitor 86.

The voltages derived at detectors 28, 30 are applied to potentiometer 22. The wiper arm 23 of the potentiometer is connected to lead 44 and in turn to the base of a transistor 90, which along with transistor 92 form the bistable flip-flop circuit or multivibrator 46 of FIG. 2. A variable resistor 91 connected in series with detectors 28, 30 and ground, respectively, is provided to bias the detectors so as to make them compatible for correct operation with the flip-flop circuit 46.

A voltage applied to the base of transistor 90 sufficiently positive to forward bias transistor 90 turns the last-mentioned transistor on and turns transistor 92 off. Transistor 90 is maintained on by A+ derived at source 98. Conversely, a more negative voltage applied to the base of transistor 90 which causes it to be reverse biased, turns the last-mentioned transistor off and transistor 92 on. Likewise A+ from source 98 is provided to maintain the transistor 92 in an on state. Thus, it follows that when the FM signal is of a greater signal strength than the AM signal, the voltage at wiper 23 is more positive, causing transistor 90 to be turned on and transistor 92 to be turned off. When the AM signal is stronger, the opposite occurs. If the wiper arm 23 is positioned nearer terminal 64, a relatively low level AM signal can override a relatively high level FM signal, so that one preferring to hear an AM radio station located at the same dial setting as an FM station, will be able to produce this result. Likewise, moving the wiper arm 23 nearer the terminal 66 will permit a relatively low level FM signal to override a higher magnitude AM signal received simultaneously therewith.

The pair of indicator lamps 11, 13, described heretofore, are shown in the schematic diagram of FIG. 3, and each is connected to the collector electrode of a transistor 94, 96, respectively. The last-mentioned transistors are each connected through a transistor 95, 97, respectively to sense the state of multivibrator 46 and operate accordingly. When transistor 90 is turned on, transistors 94, 95 are turned on also, causing voltage from A+ source 98, to be supplied for the illumination of lamp 11. With transistor 92 off, transistors 96, 97 are turned off as well, thereby turning off the AM indicator lamp 13.

Upon turning on transistor 90, indicating a more positive voltage at the base thereof and thus a stronger FM signal, the voltage at base 100 of transistor 102, serving as the AM audio switch 52, becomes relatively low. A voltage divider effect obtained from the resistors 104, 106, 108, places a higher voltage on the base of transistor 110, which serves as the FM audio switch 54 (FIG. 2). Thus, transistor 110 acting as an emitter follower, thereby passes the FM audio signals from terminal 112 of the receiver portion 26 along lead 114 to the audio output 116. The emitter voltage on transistor 110, which is higher than the base voltage of transistor 102, is likewise applied at junction 118 and to the emitter of transistor 102 to reverse bias the latter transistor, causing it to be turned off and to remain in that condition, thus blocking any AM radio signals from output 116.

In the opposite case, wherein a more negative voltage is applied on lead 44 to the flip-flop 46 a similar operation occurs, herein using the voltage divider effect of resistors 120, 122, 124 which is similar to that of resistors 104, 106, 108 to supply a voltage to the base 100 of transistor 102 and the latter transistor acting as an emitter follower places a voltage on the emitter of transistor 110 to reverse bias the transistor and thus turn it off. In the latter instance, audio signals from the AM signal source are permitted to pass through audio switch 52 to the audio output 116.

In the manner described above, a substantially constant DC voltage is maintained at junction 118 regardless of which waveband audio signals are passed to the audio output. The latter avoids "popping" in the audio output when switching the flip-flop 46 during the selection of an opposite waveband.

Thus, the multi-band radio receiver according to the invention provides a listener with means to listen to separate radio stations of two different wavebands automatically while tuning the receiver over its range of frequencies, without a need for manually switching between the two wavebands. Also, and more importantly, the listener is provided with a means to insure that he may listen to a preferred waveband even if the signal strength of the radio signals received thereon are predeterminedly weaker than radio signals received simultaneously therewith on another waveband. Furthermore, the relative strength requirement of the signal on a preferred waveband to be translated to an audio output, may be adjusted over a wide range. In addition, the radio receiver may be so adjusted as to serve merely as a single waveband radio receiver if desired.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. A multi-band radio receiver adapted to receive amplitude modulated radio frequency signals on a first waveband simultaneously with frequency modulated radio frequency signals on a second waveband which automatically selects audio signals for translation into an audio output from one of said wavebands in preference to audio signals from the other of said wavebands, said multi-band radio receiver including in combination: first receiver means for receiving said amplitude modulated radio frequency signals on said first waveband, second receiver means for receiving said frequency modulated radio frequency signals on said second waveband simultaneously with the receipt of said first radio frequency signals by said first receiver means, tuning means for tuning said first and second receiver means simultaneously to receive a particular one of said radio frequency signals on each of said wavebands, first detector means connected to said first receiver means for providing a first output voltage proportional in magnitude to the signal strength of a radio frequency signal received by said first receiver means, second detector means connected to said second receiver means for providing a second output voltage proportional in magnitude to the signal strength of a radio frequency signal received by said second receiver means, and comparator means connected to said first and second detector means for comparing the magnitudes of said output voltages including means for translating audio frequency signals from one of said receiver means into an audio output in accordance with said comparison, said comparator means including voltage magnitude adjustment means for altering the relative magnitudes of the output voltages from said detector means to select audio frequency signals of one of said receiver means for translation into an audio output in preference to audio frequency signals from the other of said receiver means.

2. A multi-band radio receiver as claimed in claim 1 wherein a first one of said detector means is connected to one of said first and second receiver means for providing a positive output voltage proportional to the strength of said radio frequency signals received by said receiver means and the second one of said detector means is connected to the other one of said first and second receiver means for providing a negative output voltage proportional to the signal strength of said radio frequency signals received by said receiver means, and wherein said comparator means includes summing means for adding the voltage outputs of said detector means and comparing the sum thereof to a reference voltage.

3. A multi-band radio receiver as claimed in claim 2 wherein said comparator means includes a bistable switch means operable to a first state upon receipt of an input signal positive with respect to said reference voltage and operable to a second state upon receipt of an input signal negative with respect to said reference voltage and a pair of audio output means connected to said bistable switch means and one of which is connected to said first receiver means for translating audio frequency signals therefrom into an audio output and the other of which is connected to said second receiver means for translating audio frequency signals therefrom into an audio output, said first one of said audio output means being operable in accordance with the operation of said bistable switch means to said first state and said other audio output means being operable in accordance with the operation of said bistable switch means to said second state.

4. A radio receiver adapted to receive amplitude modulated radio frequency signals on a first waveband simultaneously with frequency modulated radio frequency signals on a second waveband, which selects automatically for translation into an audio output, audio signals on one of said wavebands in preference to audio signals on the other of said wavebands, said radio receiver including in combination: first receiving means for receiving said amplitude modulated radio frequency signals on said first waveband, second receiving means for receiving said frequency modulated radio frequency signals on said second waveband simultaneously with the receipt of said first radio frequency signals, tuning means for tuning said first and second receiving means simultaneously to receive a particular one of said radio frequency signals on each of said wavebands, first detector means connected to one of said first and second receiving means for providing a positive polarity output voltage proportional to the strength of the radio frequency signals received by said one receiving means, second detector means connected to the other of said first and second receiving means for providing a negative polarity output voltage proportional to the strength of the radio frequency signals received by said other receiving means, voltage summing means coupled to the outputs of said first and second detectors for adding proportionally the voltage outputs therefrom, and bistable means coupled to said voltage summing means and to said first and second receiving means, said bistable means receiving an output voltage from said voltage summing means and being operable to first and second states in accordance with the magnitude of said output voltage to translate audio frequency signals from a corresponding receiving means into an audio output, said bistable means being operable to a first state upon receipt of a voltage output from said voltage summing means having at least a predetermined magnitude and to a second state upon receipt of a voltage output from said voltage summing means of a magnitude less than said predetermined magnitude, said voltage summing means further including adjustable voltage dividing means connected to the outputs of said detector means and to said bistable means for adjusting the ratio of the voltage outputs of said detector means comprising the voltage output of said voltage summing means, thereby to alter the signal strength requirement of radio frequency signals on a preferred waveband for translation of corresponding audio frequency signals therefrom into an audio output.

5. A multi-band radio receiver adapted to receive amplitude modulated radio frequency signals on a first waveband simultaneously with frequency modulated signals on a second waveband which automatically selects for translation into an audio output, audio signals from one waveband in preference to audio signals from the other waveband, said radio receiver including in combination: first receiving means for receiving amplitude modulated radio signals on said first waveband, second receiving means for receiving frequency modulated radio signals on said second waveband simultaneously with the receipt of said first radio signals, tuning means for tuning said first and second receiving means simultaneously to receive a particular radio frequency signal on each of said wavebands, first detector means connected to one of said first and said second receiving means for providing a positive polarity output voltage proportional to the signal strength of a radio frequency signal received by said one receiving means, second detector means connected to the other of said first and second receiving means for providing a negative polarity output voltage proportional to the signal strength of a radio frequency signal received by said other receiving means, comparator means coupled to said first and second detector means for receipt of said output voltages therefrom, said comparator means providing a voltage of a resultant polarity in accordance with the receipt of said voltages from said first and second detector means, bistable means coupled to said comparator means for sensing said resultant voltage and in accordance with the polarity thereof being operated to a first or second stable state, and first and second signal translation means coupled to said bistable means, said first signal translation means operated to translate audio signals of said first receiver means into an audio output upon said bistable means being operated to said first stable state and the second signal translating means being operated to translate audio signals of said second receiving means upon said bistable means being operated to said second stable state, said comparator means further including voltage adjustment means for altering the relation of said output voltages from said first and second detector means to select audio signals from one of said receiving means for translation by one of said first and second signal translation means in preference to audio signals from the other of said receiving means.

6. A multi-band radio receiver as claimed in claim 5 wherein said comparator means includes voltage summing means for summing the voltages derived from said first and second detector means to provide said resultant voltage.

7. A multi-band radio receiver as claimed in claim 6 wherein said voltage summing means includes a variable resistor adjustable to alter the ratio of the voltages from said detector means used to produce said resultant voltage sensed by said bistable means, so as to change the required signal strength of the radio signals received at a preferred one of said first and second receiving means for translation of corresponding audio signals therefrom into an audio output.

8. A multi-band radio receiver as claimed in claim 5 wherein each said receiving means includes an IF signal producing means for producing signals having a magnitude proportional to the strength of said radio signals and wherein a corresponding detector means is connected for receipt of said IF signals, and wherein the magnitude of each of the output voltages of said detector means is proportional to the strength of the IF signals received thereby.

9. A multi-band radio receiver as claimed in claim 8 wherein said first and second signal translation means each include a transistor coupled between a corresponding receiving means for passing audio signals derived in said receiving means from radio frequency signals received thereby, to said audio output, the emitter electrodes of both said transistors being connected to the audio output of said receiver, and wherein said bistable means includes means for providing a voltage of a predetermined value at said emitter electrodes regardless of the state of operation thereof, and for providing a voltage of a second predetermined value at the base electrode of said first transistor upon being operated to a first stable state so as to bias said transistor to a state of conduction, thereby to pass audio signals from said first receiving means to said audio output and for providing a voltage of said second predetermined value at the base electrode of said second transistor to bias said transistor to a state of conduction upon being operated to said second stable state, thereby to pass audio signals from said second receiving means to said receiver output.

* * * * *